United States Patent

Anthofer et al.

[11] Patent Number: 6,081,044
[45] Date of Patent: Jun. 27, 2000

[54] METHOD FOR TRIPPING A RESTRAINT DEVICE IN A VEHICLE

[75] Inventors: Anton Anthofer, Freihung; Michael Wächter, Regensburg; Marten Swart, Obertraubling, all of Germany

[73] Assignee: Siemens Aktiengesellschaft, Munich, Germany

[21] Appl. No.: 09/149,815

[22] Filed: Sep. 8, 1998

Related U.S. Application Data

[63] Continuation of application No. PCT/DE97/00297, Feb. 17, 1997.

[30] Foreign Application Priority Data

Mar. 8, 1996 [DE] Germany .................... 196 09 076

[51] Int. Cl.$^7$ .................................................. B60K 28/12
[52] U.S. Cl. ...................... 307/10.1; 180/282; 280/735
[58] Field of Search ................................ 307/9.1, 10.1, 307/121; 180/274, 282, 279; 280/734, 735, 728.1, 801.1, 806; 701/45–47, 114, 29; 395/733–742, 867, 868, 580, 591; 340/825.12

[56] References Cited

U.S. PATENT DOCUMENTS

| | | | |
|---|---|---|---|
| 5,381,334 | 1/1995 | Furui | 307/10.1 |
| 5,422,965 | 6/1995 | Bekki et al. | 280/735 |
| 5,620,202 | 4/1997 | Gray et al. | 280/735 |
| 5,712,784 | 1/1998 | Fendt et al. | 280/735 |

FOREIGN PATENT DOCUMENTS 0 471 871 B1  2/1992  European Pat. Off. .

*Primary Examiner*—Richard T. Elms
*Attorney, Agent, or Firm*—Herbert L. Lerner; Laurence A. Greenberg; Werner H. Stemer

[57] ABSTRACT

In a method for tripping a restraint device in a vehicle, coded information signals with status and diagnosis messages are transmitted in both directions between an evaluation device and an ignition device. To avoid the situation where a tripping signal for the restraint device may be delayed in its transmission to the ignition device because the data throughput in the transmission medium is high, the transmission of the information signals is interrupted. Accordingly, the transmission of the information signals in the forward and return directions is controlled by the evaluation device. As a function of a collision signal furnished by a sensor device, the transmission of the information signals is ended by the evaluation device, so that the transmission medium between the evaluation device and the ignition device remains free for a possibly ensuing tripping signal.

10 Claims, 1 Drawing Sheet

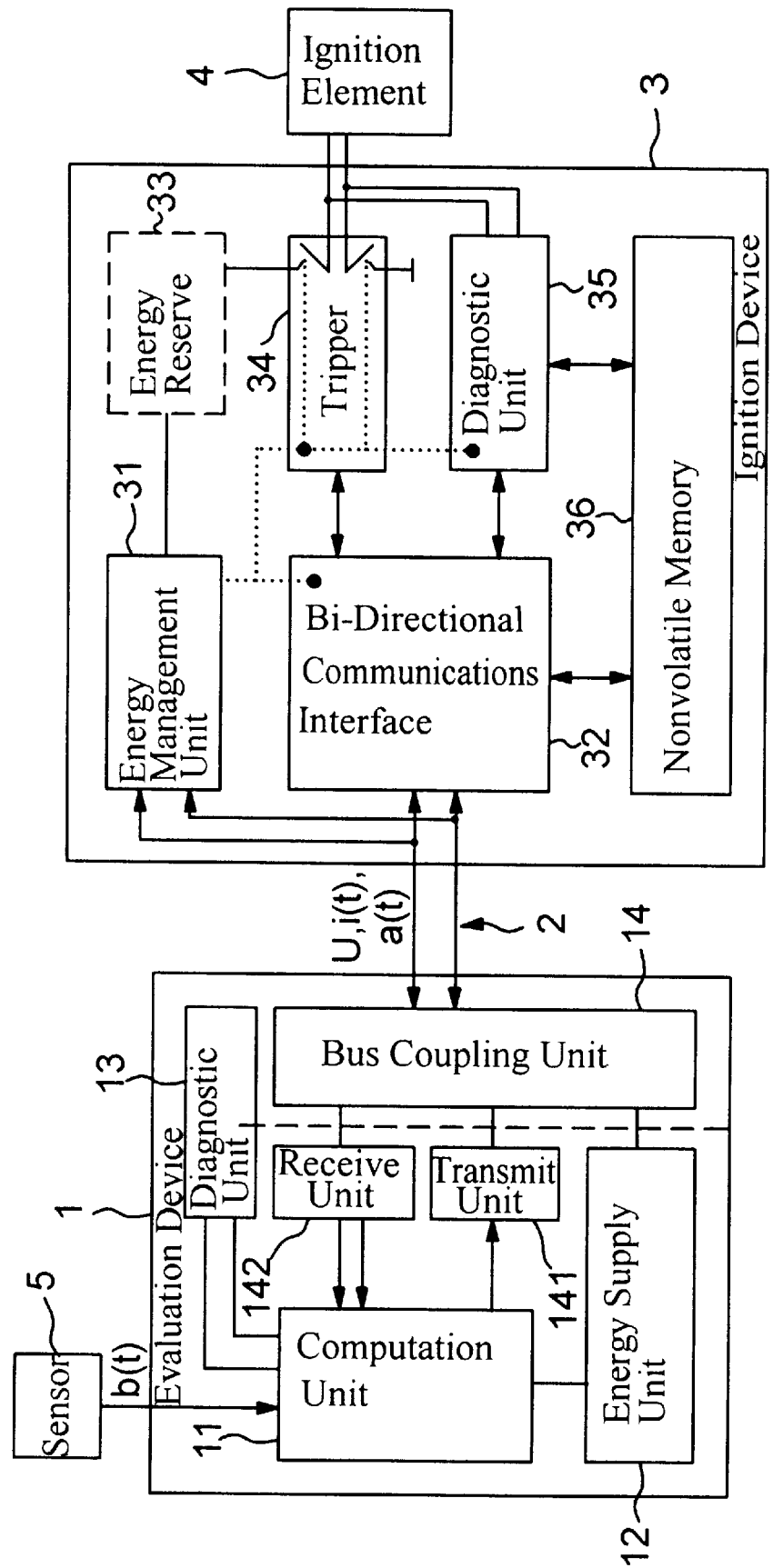

6,081,044

METHOD FOR TRIPPING A RESTRAINT DEVICE IN A VEHICLE

CROSS-REFERENCE TO RELATED APPLICATION

This is a continuation of copending International Application PCT/DE97/00297, filed Feb. 17, 1997, which designated the United States.

BACKGROUND OF THE INVENTION

Field of the Invention

The invention relates to a method for tripping a restraint device in a vehicle.

A configuration for tripping a restraint device in a vehicle is disclosed in European Patent EP 0 471 871 B1. The configuration includes an evaluation device, disposed centrally in the vehicle, in which a collision signal furnished by a sensor device is evaluated. The configuration also has ignition devices, distributed around the vehicle which are connected via one or more lines to the evaluation device. The evaluation device furnishes coded signals to the ignition devices. Each ignition device is electrically connected to an ignition element of a restraint device (i.e. air bag, seat belt tightener). Depending on the signals furnished by the evaluation device, the ignition element associated with the ignition device is acted upon by energy from an ignition capacitor of the ignition device, and thus trips the associated restraint device.

A coded signal transmitted by the evaluation device to the ignition device may contain more than merely a tripping command for igniting the ignition element. Such a signal can at the same time contain a challenge signal to the ignition device or other information, for instance about the electrical status of the evaluation device. A coded signal transmitted by the ignition device to the evaluation device may at the same time contain information about the electrical status of the ignition device, for instance about the ignition voltage applied to the ignition element via a controllable switch device, or about the ignition element resistance itself.

Each coded signal that is transmitted between the evaluation device and the ignition device in the forward or return direction will hereinafter be called an information signal. Only a tripping signal, which is transmitted from the evaluation device to the ignition device for igniting the ignition element, is singled out from the set of information signals.

When it is functioning properly the configuration is continuously monitored for operability. The medium for message transmission between the evaluation device and the ignition device, typically, an electrical line and in particular a two-wire line, a bus that connects a plurality of ignition devices to the evaluation device, an optical fiber, or a medium for wireless data transmission may be burdened by a high data throughput, especially if a plurality of ignition devices exchange data with the evaluation device.

If the evaluation device detects the necessity for tripping one or more restraint devices from a collision signal furnished by a sensor device, a tripping signal is sent to the affected ignition device. If at the moment of the demand for tripping the transmission medium is blocked because of a high throughput of information signals, then there is the risk that a tripping signal generated by the evaluation device cannot be transmitted quickly enough to the affected ignition device. The transmission time between the evaluation device and the ignition device plays an even greater role, the shorter the time period (commencing with the collision) within which the restraint device must be tripped. For tripping a side air bag, for instance, the period is approximately 5 msec long. In such time-critical applications, care must particularly be taken therefore to assure that the tripping signal after being generated in the evaluation circuit can be imposed on the medium without delay and transmitted to the ignition device. Delayed transmission of the tripping signal between the evaluation device and the ignition device causes late tripping of the restraint device and may lead to passenger injuries.

SUMMARY OF THE INVENTION

It is accordingly an object of the invention to provide a method for tripping a restraint device in a vehicle which overcomes the hereinafore-mentioned disadvantages of the heretofore-known methods of this general type, which creates a process for data transmission between an evaluation device and an ignition device that assures a punctual transmission of a tripping signal from the evaluation device to the ignition device.

With the foregoing and other objects in view there is provided, in accordance with the invention, a tripping method for a vehicle, which includes: evaluating in an evaluation device a collision signal furnished by a sensor device; transmitting coded information signals in both directions between the evaluation device and an ignition device electrically connected to an ignition element of a restraint device; controlling the transmitting of the coded information signals by the evaluation device; ending the transmitting of the coded information signals in dependence on the collision signal; and furnishing a coded tripping signal for tripping the restraint device by the evaluation device to the ignition device in dependence on the collision signal.

The object is attained in that the transmission of the information signals in both the forward and return directions is controlled by the evaluation device. As a function of the collision signal furnished by the sensor device, the transmission of the information signals by the evaluation device is ended. Thus the transmission medium between the evaluation device and the ignition device is free for a possibly ensuing tripping signal, so that by the method of the invention a delay in the transmission of the tripping signal to the ignition device is prevented.

The transmission of information signals by the evaluation device is controlled such that a transmission of the information signal from the ignition device to the evaluation device is preceded by a transmission of an information signal from the evaluation device to the ignition device. By use of the information signal furnished by the evaluation device and containing a request for a response in return, the ignition device is made for instance to perform diagnostic functions and to monitor the resistance of the ignition element, the ignition voltage applied to the ignition element via at least one controllable switch, the operability of the controllable switch, or the ignition circuit (ignition element, controllable switch) for leakage resistances. The outcome of a measurement or the evaluated outcome of the measurement are sent back to the evaluation device in the form of a coded information signal. In response to the request by the evaluation device, other status data, buffer-stored in a memory of the ignition device, may also be transmitted. As soon as at least a slight likelihood for the tripping of one or more restraint devices can be derived from the collision signal, the transmission of information signals to the ignition device is stopped. Thus the transmission of information signals from the ignition device to the evaluation device also stops.

The collision signal, which for instance is transmitted to the evaluation device in the form of a filtered analog output signal of an acceleration sensor, is preferably compared with a threshold value. If the collision signal exceeds the threshold value, the transmission of the information signals by the evaluation device is stopped. At the same time, however, a fixed minimum rise in the collision signal or some other criterion for the cessation of the transmission of information signals may also be definitive. The instant at which the transmission of the information signals is stopped may be equal to a starting instant for the algorithmic evaluation of the collision signal by the evaluation device. The threshold is selected such that slight jarring of the vehicle and the like will not cause intensive computation in the form of algorithmic evaluation of the collision signal.

Preferably, after a fixed period of time after the cessation of the transmission of the information signals has elapsed, with the simultaneous absence of a tripping signal during this period of time, the transmission of the information signals is resumed. The instant may for instance also be determined by undershooting of a further threshold on the part of the collision signal.

In addition, both the instant of cessation of the transmission of information signals and the instant when this provision is cancelled again can also be obtained algorithmically from the collision signal.

The collision signal is also not necessarily understood to be a sensor signal of a single acceleration or crash sensor. The collision signal may for instance be a preprocessed crash or acceleration signal that is obtained by single or multiple integration and/or filtration. Furthermore, the collision signal may be determined by sensor signals from a plurality of sensors. In each case, at the instant when the transmission of information signals is discontinued, tripping of the restraint device should be possible.

In another advantageous feature, the signal furnished by the crash sensors of the sensor device are evaluated in the sensor device itself. The sensor device furnishes a coded collision signal to the evaluation device, in response to which tripping of the restraint device is to be initiated. An example for this is a sensor device for side collision detection, disposed in a side portion of the vehicle and whose collision signal, furnished to the evaluation device, contains the information that a side collision that has occurred is severe enough to trip the restraint device, for example, a side air bag or a head air bag. In the evaluation device, the collision signal is processed along with other signals, for instance furnished by a seat occupation detector or a sensor for front collision detection. As a function of all these signals, the final tripping signal is transmitted to the ignition device assigned to the side air bag.

In such a refinement of the invention, the transmission of information signals is again stopped as a function of the collision signal. But, as soon as the evaluation device detects that the collision signal arrives, or in other words in the best case at the time when the first edge of the coded tripping signal is detected by the evaluation device.

In accordance with an added feature of the invention, there are the steps of embodying the collision signal as a code signal, and ending the transmitting of the coded information signals upon an arrival of the collision signal in the evaluation device.

In accordance with an additional feature of the invention, there is the step of transmitting via the evaluation device an information signal to the ignition device requesting the ignition device to return a further information signal to the evaluation device.

In accordance with another feature of the invention, there is the step of ending the transmission to the ignition device of the information signal requesting a returned transmission of the further information signal in dependence on the collision signal.

In accordance with a concomitant feature of the invention, there is the step of sending the further information signal containing information about a resistance of the ignition element from the ignition device to the evaluation device. The further information signal may also contain information about: an ignition voltage applied to the ignition element via at least one controllable switch, the operability of at least one controllable switch disposed in series with the ignition element, and/or a leakage resistance in the ignition element and at least one controllable switch disposed in series with the ignition element.

Other features which are considered as characteristic for the invention are set forth in the appended claims.

Although the invention is illustrated and described herein as embodied in a method for tripping a restraint device in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block circuit diagram of a configuration for tripping a restraint device in a vehicle according to the invention.

DESCRIPTION OF THE PREFERRED EMBODIMENTS

Referring now to the single FIGURE of the drawing in detail there is shown a configuration which includes an evaluation device 1, which is electrically connected via a two-wire line 2 to an ignition device 3. The evaluation device 1 includes a computation unit 11, a diagnostic unit 13, a bus coupling unit 14, a receiving unit 142, a transmitting unit 141, and an energy supply unit 12. The ignition device 3 includes a bidirectional communications interface 32, an energy management unit 31, an energy reserve 33, a tripper 34, a diagnostic unit 35, and a nonvolatile memory 36. The ignition device 3 is electrically conductively connected to an ignition element 4. The evaluation device 1 is electrically connected to a sensor device 5.

The energy supply 12 of the evaluation device 1 supplies both the computation unit 11 and all the other function blocks of the evaluation device 1 with energy. In the computation unit 11, a collision signal b(t) furnished by the sensor device 5 for collision detection is evaluated. At least the computation unit 11 is monitored for operability by the diagnostic unit 13.

The data exchange between the evaluation unit 1 and the ignition device 3 is also controlled by the computation unit 11. The evaluation unit 1 furnishes coded information signals i(t) and, upon a demand for tripping, a coded tripping signal a(t) additively to form a direct signal U, to the ignition device 3 via the line 2. The direct signal U is furnished by the evaluation device 1 to the ignition device 3 during operation of the configuration for supplying energy to the ignition device 3. However, the ignition device 3 may also be supplied with energy via its own line from the evaluation device 1 or directly by the on-board electrical system, so that only information signals and tripping signals i(t) and a(t) are transmitted over the line 2.

In the transmitting and receiving units 141 and 142, together with the bus coupling 14 of the evaluation device 1, messages are sent and received, in the form of encoded alternating signals. The evaluation of received data and the compiling of data to be transmitted are performed by the computation unit 11, which thus not only performs the evaluation of the collision signal b(t) furnished by the sensor device 5 but also, in the course of communications between the evaluation device 1 and the ignition device 3, acts as a bidirectional communications interface for higher levels and is preferably embodied as a microprocessor.

By use of the bidirectional communications interface 32, the data transmission on the part of the ignition device 3 is controlled. Thus the bidirectional communications interface 32 includes at the same time the functionality of the near-hardware function blocks including the bus coupling 14, transmitter 141, receiver 142 and computation unit 11 of the evaluation device 1, with regard to data transmission. The received information signals and evaluation signals i(t) and a(t) are evaluated and converted into control signals in the bidirectional communications interface 32.

The function energy management unit 31 decouples the direct signal U from the signal transmitted to the ignition device 3 and thus drives various circuit components, in particular the bidirectional communications interface 32. By use of the energy management unit 31, an energy reserve 33 in the form of an ignition capacitor is also charged. From it, the ignition element 4 is ignited if tripping occurs, and optionally the bidirectional communications interface 32 is supplied with energy at least for a short time, if the standard energy supply is disrupted or fails entirely.

When a tripping signal a(t) that is recognized as such by the bidirectional communications interface 32 is received, then the tripper 34, in the form of at least one controllable switch, is triggered by the bidirectional communications interface 32, so that the energy required to ignite the ignition element 4 is transmitted from the energy reserve 33 to the ignition element 4. If the corresponding information signal i(t) is received, the bidirectional communications interface 32 causes the diagnostic unit 35 to monitor parts and components of the ignition device 3 for their operability.

The processing instructions required for diagnostic, evaluation and transmission functions are stored in the nonvolatile memory 36.

We claim:

1. A tripping method for a vehicle, which comprises:

evaluating in an evaluation device a collision signal furnished by a sensor device;

transmitting coded information signals in both directions between the evaluation device and an ignition device electrically connected to an ignition element of a restraint device;

controlling the transmitting of the coded information signals by the evaluation device;

ending the transmitting of the coded information signals in dependence on the collision signal; and furnishing a coded tripping signal for tripping the restraint device by the evaluation device to the ignition device in dependence on the collision signal.

2. The method according to claim 1, which comprises ending the transmitting of the coded information signals if the collision signal exceeds a threshold value.

3. The method according to claim 1, which comprises embodying the collision signal as a code signal, and ending the transmitting of the coded information signals upon an arrival of the collision signal in the evaluation device.

4. The method according to claim 1, which comprises resuming a transmission of the coded information signals as soon as a fixed period of time after a cessation of the transmitting of coded information signals has elapsed, and if no tripping signal had been generated by the evaluation device during the fixed period of time.

5. The method according to claim 1, which comprises transmitting via the evaluation device an information signal to the ignition device requesting the ignition device to return a further information signal to the evaluation device.

6. The method according to claim 5, which comprises ending the transmission to the ignition device of the information signal requesting a returned transmission of the further information signal in dependence on the collision signal.

7. The method according to claim 5, which comprises sending the further information signal containing information about a resistance of the ignition element from the ignition device to the evaluation device.

8. The method according to claim 5, which comprises sending the further information signal containing information about an ignition voltage applied to the ignition element via at least one controllable switch from the ignition device to the evaluation device.

9. The method according to claim 5, which comprises sending the further information signal containing information about operability of at least one controllable switch disposed in series with the ignition element from the ignition device to the evaluation device.

10. The method according claim 5, which comprises sending the further information signal containing information about a leakage resistance in the ignition element and at least one controllable switch disposed in series with the ignition element from the ignition device to the evaluation device.

* * * * *